United States Patent
Potnis et al.

(10) Patent No.: US 10,929,257 B1
(45) Date of Patent: Feb. 23, 2021

(54) METHOD AND APPARATUS FOR DEFINING LOCAL FAILURE USING STORAGE GROUP CONTAINERS

(71) Applicant: EMC IP HOLDING COMPANY LLC, Hopkinton, MA (US)

(72) Inventors: Ajay Potnis, Pune (IN); Amit Dharmadhikari, Pune (IN); Vijay Srinivasan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 261 days.

(21) Appl. No.: 16/263,212

(22) Filed: Jan. 31, 2019

(51) Int. Cl.
*G06F 11/00* (2006.01)
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0664* (2013.01); *G06F 3/0673* (2013.01); *G06F 2201/82* (2013.01)

(58) Field of Classification Search
CPC .... G06F 3/0619; G06F 3/0664; G06F 3/0673; G06F 11/2094; G06F 2201/82
See application file for complete search history.

(56) References Cited

U.S. PATENT DOCUMENTS

| | | | | |
|---|---|---|---|---|
| 7,966,517 B2 * | 6/2011 | Shitomi | ................ | G06F 3/061 714/5.11 |
| 10,795,786 B1 * | 10/2020 | Potnis | ................ | G06F 11/2069 |
| 10,795,787 B1 * | 10/2020 | Potnis | ................ | G06F 16/188 |
| 10,831,618 B1 * | 11/2020 | Potnis | ................ | G06F 11/1435 |
| 2009/0240975 A1 * | 9/2009 | Shitomi | ................ | G06F 3/067 714/5.11 |
| 2011/0167234 A1 * | 7/2011 | Nishibori | ............ | G06F 11/1456 711/162 |
| 2014/0007189 A1 * | 1/2014 | Huynh | ................ | H04L 67/1095 726/3 |
| 2016/0179797 A1 * | 6/2016 | Merten | ............... | G06F 12/0802 711/203 |
| 2017/0269859 A1 * | 9/2017 | Xu | ........................ | G06F 3/0617 |
| 2018/0095851 A1 * | 4/2018 | Zhang | ................ | G06F 11/2094 |

* cited by examiner

*Primary Examiner* — Joshua P Lottich
(74) *Attorney, Agent, or Firm* — Anderson Gorecki LLP (57) ABSTRACT

A method for defining local failover within a storage system using storage group containers includes creating a plurality set of storage groups from physical storage resources of a storage array of the storage system, and creating a masking view identifying a first subset of the storage groups and specifying that Thin Logical Units (TLUs) in the first subset of storage groups are visible only to a primary Software Defined Network Attached Storage (SDNAS) process executing on the storage system and to a backup SDNAS process executing on the storage system. The first set of storage groups includes a Virtual Data Mover (VDM) configuration/root TLU and all user data TLUs used by the primary SDNAS process to thereby enable the set of storage groups used by the SDNAS to be used as a container for local failover.

17 Claims, 5 Drawing Sheets

METHOD AND APPARATUS FOR DEFINING LOCAL FAILURE USING STORAGE GROUP CONTAINERS

BACKGROUND

This disclosure relates to computing systems and related devices and methods, and, more particularly, to a method and apparatus for defining local failover using storage group containers.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter which is set forth by the claims presented below.

All examples and features mentioned below can be combined in any technically possible way.

In some embodiments, a method for defining local failover within a storage system using storage group containers includes creating a plurality set of storage groups from physical storage resources of a storage array of the storage system, and creating a masking view identifying a first subset of the storage groups and specifying that Thin Logical Units (TLUs) in the first subset of storage groups are visible only to a primary Software Defined Network Attached Storage (SDNAS) process executing on the storage system and to a backup SDNAS process executing on the storage system. The first set of storage groups includes a Virtual Data Mover (VDM) configuration/root TLU and all user data TLUs used by the primary SDNAS process to thereby enable the set of storage groups used by the SDNAS to be used as a container for local failover.

In some embodiments, the primary SDNAS process is executing in a first emulation on the storage system, the first emulation having a first operating system, the method further comprising mounting, by the first operating system, each TLU in the first subset of storage groups; and the backup SDNAS process is executing in a second emulation on the storage system, the second emulation having a second operating system, the method further comprising mounting, by the second operating system, each TLU in the first subset of storage groups.

In some embodiments, upon local failover, responsibility for filesystems having data stored in the TLUs of the first subset of storage groups is transferred from the primary SDNAS process to the backup SNDAS process.

In some embodiments, the masking view defines a storage group container for implementing local failover within the storage system from the primary SDNAS process to the backup SDNAS process.

In some embodiments, upon local failover, the method further comprising the step of changing the masking view to identify the backup SDNAS process and a third SDNAS process.

In some embodiments, the primary SDNAS process has a first user Virtual Data Mover (VDM) process executing in the context of the SDNAS process, the VDM process being configured to manage access to one or more user filesystems of the SDNAS process.

In some embodiments, the VDM configuration/root TLU contains a VDM root filesystem and a VDM configuration filesystem, the VDM configuration filesystem describing how data of the one or more user filesystems managed by the VDM is stored in the physical storage resources of the storage array.

In some embodiments, the SDNAS process has a plurality of user Virtual Data Mover (VDM) processes executing in the context of the SDNAS process, the plurality of VDM processes sharing the first subset of the storage groups to store data of the user filesystems managed by the VDM.

In some embodiments a storage system includes a base operating system, a storage array containing physical storage resources, the storage groups being created from storage resource pools of the physical storage resources having particular storage characteristics, a hypervisor, a plurality of emulations, each emulation having a respective emulation operating system and one or more applications executing in the context of the emulation operating system, and a masking view restricting access by the emulations to storage groups of the storage array, the masking view specifying that a first subset of storage groups used by a primary Software Defined Network Attached Storage (SDNAS) process executing in a first of the plurality of emulations is only visible to the primary SDNAS process executing in the first of the plurality of emulations and to a secondary SDNAS process executing in a second of the plurality of emulations.

In some embodiments, the first subset of storage groups contains a first set of Thin Logical Units (TLU) mounted by the emulation operating system of the first of the plurality of emulations and mounted by the emulation operating system of the second of the plurality of emulations.

In some embodiments, the storage system further includes a first Virtual Data Mover (VDM) process executing in the context of the primary SDNAS process and responsible for a first user filesystem, the first user filesystem having data stored in one of the TLUs of the first set of TLUs, and a root/configuration filesystem of the VDM being stored in a second of the TLUs of the first set of TLUs.

In some embodiments, upon failure of the first SDNAS process, responsibility for the first user filesystem is transferred to a second VDM process executing in the context of the backup SDNAS process, the second VDM having the same root/configuration filesystem as the first VDM process.

In some embodiments, the primary SDNAS process comprises a plurality of Virtual Data Mover (VDM) processes, each VDM process being responsible for at least one user file system, and the masking view specifies a subset of the storage groups of the storage array containing a set of TLUs that contain data of all of the user filesystems and root/configuration file systems for each of the plurality of VDM processes.

In some embodiments, the subset of the storage groups provides a container for local failover of the plurality of VDM processes from the primary SDNAS process to the backup SDNAS process.

In some embodiments, the masking view is a set of data structures, each data structure being associated with one of the storage groups, each data structure containing information identifying a set of SDNAS processes with access to TLUs contained in the respective storage group.

In some embodiments, the data structure further contains information identifying an initiator group corresponding to a list of data nodes that has access to the storage group.

In some embodiments, the data structure further contains information identifying a port group corresponding to a list of front end ports on which data clients are connected to access data stored in the TLUs contained in the respective storage group.

DETAILED DESCRIPTION

Figure 1:
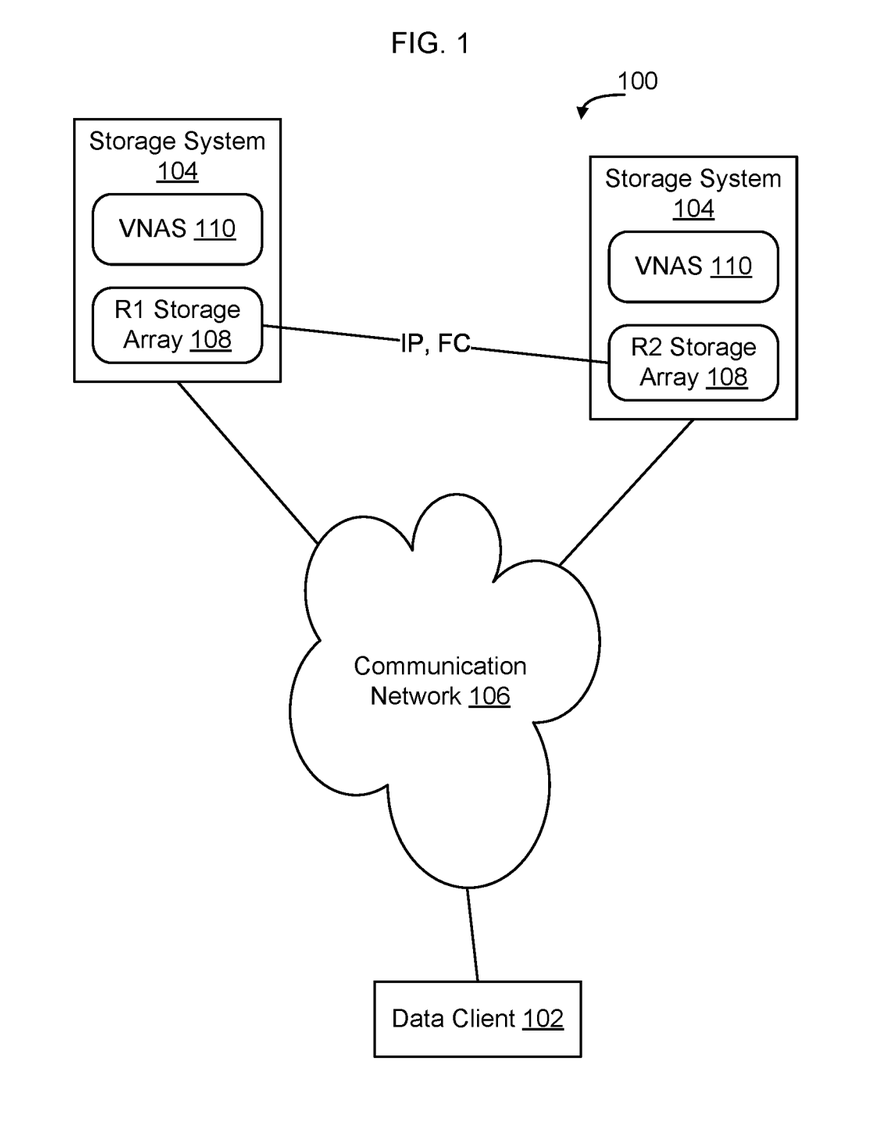
FIG. 1 is a functional block diagram of an example storage environment including software defined network attached storage systems, according to some embodiments of the present disclosure.

FIG. 1 is a functional block diagram of an example storage environment 100. As shown in FIG. 1, in storage environment 100, a data client 102 may access storage resources provided by one or more storage systems 104 over a communication network 106. In some embodiments, the communication network 106 is an Internet Protocol (IP) communication network 106 enabling transmission of IP data packets through the communication network 106, although other forms of communication networks may be used to interconnect the data client 102 with storage systems 104 depending on the implementation.

Data from the data client 102 is stored in the storage resources of the storage systems 104. Storage resources that are accessed by a data client 102 over a communication network 106 are referred to herein as Network Attached Storage (NAS). In some embodiments, each storage system 104 has a storage array 108 of physical storage resources, which are abstracted to the data client 102 by software applications running on the storage systems 104 referred to herein as "Software Defined Network Attached Storage (SDNAS) applications." A given SDNAS application may, in some embodiments, be implemented as a Virtual Network Attached Storage (VNAS) server 110.

To provide enhanced reliability, data from data client 102 may be stored in a storage system 104 and backed upon on a second storage system 104 both of which are connected to the communication network 106. In some embodiments, the data client 102 interacts with a filesystem maintained by a primary VNAS server 110 on a primary storage system 104. If a failure occurs on the primary storage system 104, on communication network 106, or elsewhere, which renders the data client 102 unable to access the filesystem on the primary storage system 104, the data client 102 is able to access the filesystem on the backup VNAS server 110 on the backup storage system 104. Similarly, within a given storage system 104, a local failover can occur in which responsibility for a user file system is transferred internally from a first VNAS server 110 to a second VNAS server 110. According to some embodiments, as discussed in greater detail herein, storage group containers are used in connection with form of local failover to enable responsibility to be transferred between VNAS servers 110 implemented in the same storage system 104.

Two or more VNAS servers 110 that are logically associated to provide redundant access to one or more filesystems will be referred to herein as a "cluster". In some embodiments, a cluster may include multiple VNAS servers 110, and each VNAS server 110 may be responsible for hundreds of filesystems. A VNAS server 110 will also be referred to herein as a "node" in a storage cluster. As used herein, the term "data Virtual Data Mover (VDM)" will be used to refer to software running on a VNAS server 110 that is responsible for managing access to and replication of one or more filesystems of the VNAS server 110. A given node in a storage cluster may have multiple SDNAS processes executing thereon, and each SDNAS process may have multiple data VDMs executing within it.

Figure 2:
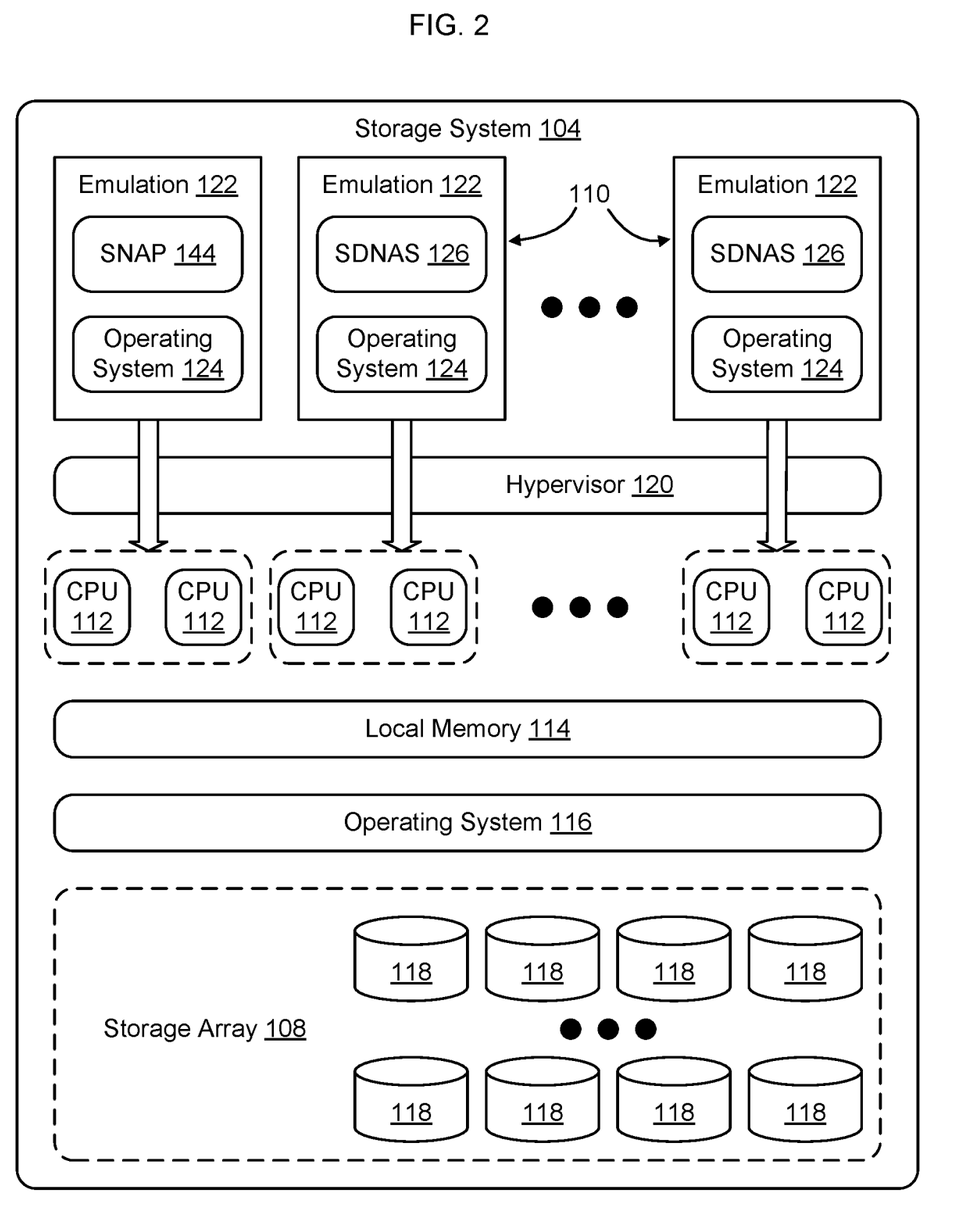
FIG. 2 is a functional block diagram of an example storage system configured to define local failover using storage group containers according to some embodiments of the present disclosure.

FIG. 2 is a functional block diagram of an example storage system 104 for use in a storage environment, such as the storage environment 100 of FIG. 1. As shown in FIG. 2, the storage system 104 has physical resources including a number of CPU processor cores 112, local memory 114, storage system operating system 116, storage array 108 which includes multiple physical storage devices 118, and other physical resources. Physical storage devices 118 may be implemented, for example, using optical disc drives or a number of other storage technologies. A hypervisor 120 abstracts the physical resources of the storage system 104 from emulations 122, and allocates physical resources of storage system 104 for use by the emulations 122. In some embodiments, Each emulation 122 has an emulation operating system 124 and one or more application processes running in the context of the emulation operating system 124. As shown in FIG. 2, in some embodiments, one or more of the emulations 122 instantiated on storage system 104 implements one or more Software Defined Network Attached Storage (SDNAS) software applications 126 configured to enable the emulation 122 to implement a VNAS server 110 on communication network 106. VNAS server 110s are also referred to herein as "data nodes". The term "local failover" will be used herein to refer to transferring responsibility for one or more user file systems between data nodes implemented on a given storage system 104.

Figure 3:
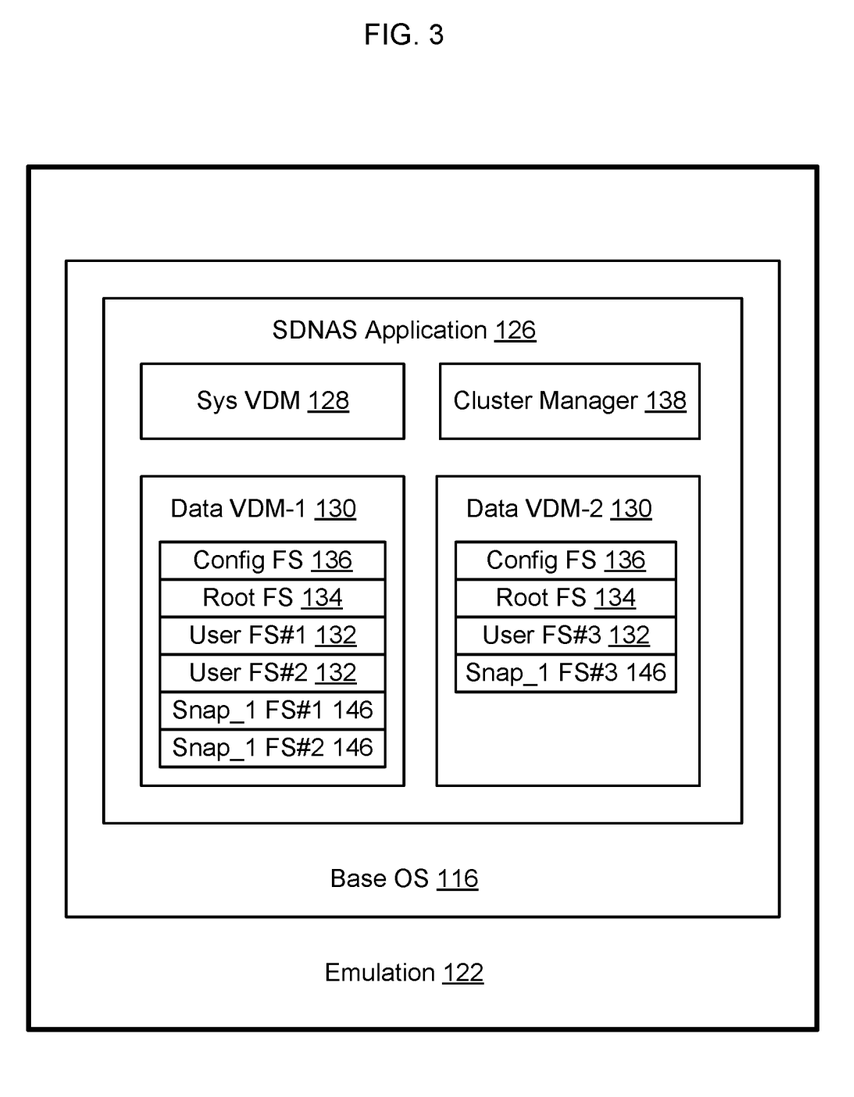
FIG. 3 is a functional block diagram of an example emulation implementing a Software Defined Networked Attached Storage (SDNAS) process of the storage system of FIG. 2, according to some embodiments of the present disclosure.

An example SDNAS application 126 is shown in greater detail in FIG. 3. As shown in FIG. 3, each SDNAS application 126 has a system Virtual Data Mover (VDM) 128 and one or more data VDMs 130. Different data VDMs 130 may be associated with different data clients 102, and each data VDM 130 is responsible for one or more user filesystems 132. Each data VDM 130 has a VDM root filesystem 134 and a VDM configuration filesystem 136. The VDM configuration filesystem 136 includes a SDNAS database describing how the data of the VDM root filesystem 134 and user filesystems 130 is stored in underlying storage resources 118 of the storage array 108.

A given storage system 104 may have emulations functioning as nodes in multiple storage clusters. One of the SDNAS applications 126 in each storage cluster executes a cluster manager 138 that controls the overall structure of the storage cluster, such as defining which nodes are included in the storage cluster, which nodes and which SDNAS applications 126 executing on those nodes are to host particular data VDMs 130, which nodes should be backup nodes for particular data VDMs 130, and which user filesystems 132 should be handled by each data VDM 130.

In the example shown in FIG. 3, SDNAS application 126 includes system VDM 128 and includes cluster manager 138. The SDNAS application 126 also includes two data VDMs 130, which are responsible for sets of user filesystems 132. For example, in the example shown in FIG. 3 data VDM 130 VDM-1 is responsible for user filesystems 132 FS #1 and FS #2 and data VDM 130 VDM-2 is responsible for user filesystems 132 FS #3.

Figure 4:
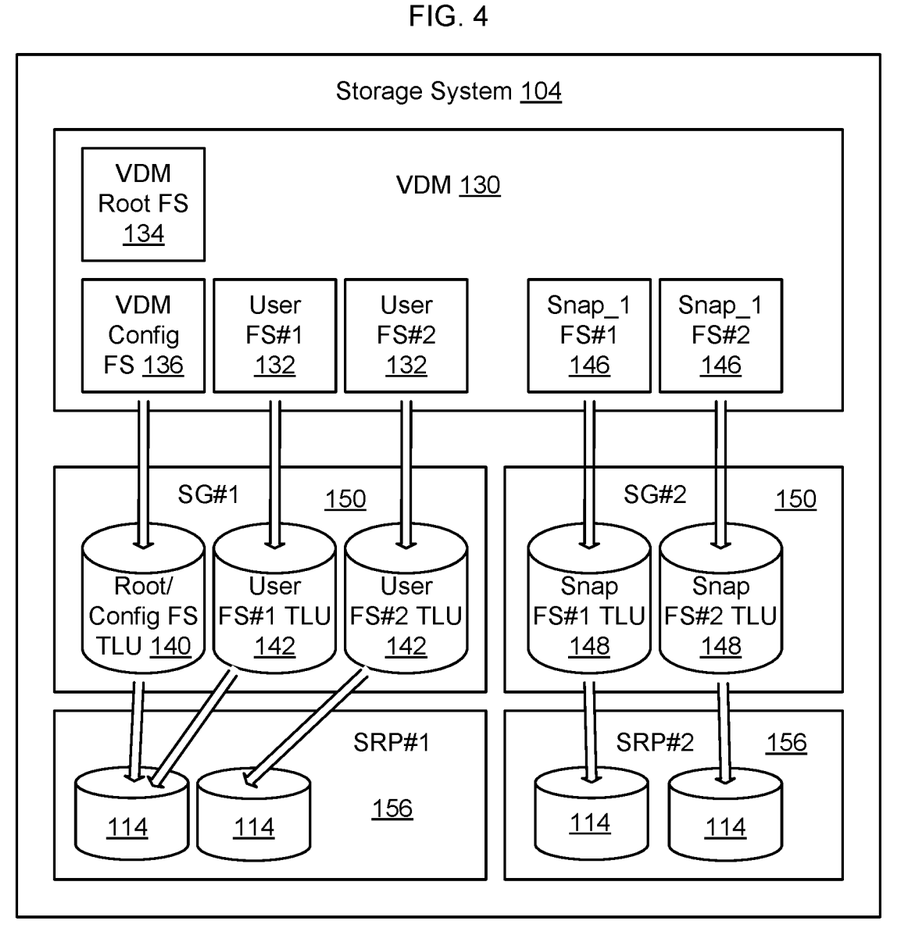
FIGS. 4 and 5 are functional block diagrams of the storage system of FIG. 1 configured to define local failover using storage group containers according to some embodiments of the present disclosure.

FIG. 4 is a functional block diagram of an example storage system 104 showing additional details related to how storage is allocated by storage system 104 to data VDM-1 of FIG. 3 according to some embodiments. As shown in FIG. 4, in some embodiments, the storage system 104 presents physical storage resources 118 of the storage array 108 to the VDM 130 as a set of logical storage volumes (LUNs), referred to herein as Thin Logical Units (TLUs). A TLU is a logical construct which enables the physical storage resources 118 of the storage array 108 to be abstracted from the VDM 130. The logical storage volume is referred to as "thin" because actual physical storage resources 118 are only allocated by the storage system 104 to the TLU as needed. Thus, the amount of storage capacity of physical storage resources 118 allocated to a TLU will increase and decrease over time as the file system stored on the TLU increases and decreases in size.

In some embodiments, the VDM root file system 134 and VDM configuration file system 136 are stored in a first TLU referred to herein as a Root/configuration file system TLU 140.

Data associated with a data client 102 is stored in a user file system 132. A given VDM may manage one or more user file systems 132. Each user file system 132 is stored in its own separate TLU referred to herein as a user file system TLUs 142. Metadata describing the mapping of the user file system TLUs 142 to physical storage resources 118 is contained in the VDM configuration file system 136.

One or more of the emulations 122 may execute applications configured to control how the storage system 104 manages the underlying storage resources provided by storage array 108. For example, one application that may be executing in an emulation 122 on storage system 104 is a snapshot application (SNAP) 144 (see FIG. 2) configured to enable the storage system 104 to provide point in time data copying. Multiple SNAP applications 144 may be executing on a given storage system 104 at any point in time. A "snapshot," as that term is used herein, is a copy of data as that data existed at a particular point in time. A snapshot copy 146 of a user file system 132, accordingly, is a copy of the data contained in the user file system 132 as the data contained in the user file system 132 existed at the point in time when the snapshot copy 146 was created. In some embodiments, the storage system 104 creates snapshot copies 146 by copying data at the block level on physical storage resources 118 that are being used to store the user file system TLU 142. Each time a snapshot copy 146 is created, it is stored in physical storage resources 118.

TLUs such as root/configuration TLU 140, user file system TLUs, and snapshot TLUs 148, are allocated storage space on particular sets of physical storage devices 118 based on intended service level objectives for the data contained in the filesystem maintained by the TLU. Different physical storage devices 118 may have different characteristics, such as different Input/Output (IO) rates, be configured to compress data prior to storage, and/or perform data de-duplication. Storage groups 150 are created from storage resource pools of physical storage devices 118 that have particular storage characteristics, to enable the storage group 150 to meet the intended service level objective for the data being stored therein. A storage group may be considered an algorithmic boundary in the storage system.

A given data node may have multiple VDMs, and a given VDM may manage multiple user filesystems 132. The different user filesystems 132 may have different service level objectives and, accordingly, the user filesystem TLUs 132 may be located in different storage groups 150. For example, in FIG. 4, root/configuration filesystem TLU 140 and user filesystem TLUs 142 are located in a first storage group 150 SG #1, and snap copy filesystem TLUs 148 are located in a second storage group 150 SG #2.

In some embodiments, a given storage group 150 is visible within storage system 104 to at most two data nodes—a primary SDNAS application 126 with primary responsibility for the filesystems stored in the storage group 150 and acting as the primary data node for those user filesystem 132, and a backup SDNAS application 126 with secondary responsibility for the filesystems stored in the storage group and acting as the backup data node for those user file system 132. Upon failure of the primary SDNAS application 126, the backup SDNAS application 126 has already mounted the filesystems contained in the TLUs of the storage group 150, and thus can assume responsibility for the user filesystems 132. The previous backup SDNAS application 126 thus assumes primary responsibility for the user filesystems 132. To assign a new backup SDNAS application 126 for the user filesystems 132, the masking view for the storage groups is simply changed to include an identifier of the new backup SDNAS application 126. Changing the masking view causes the TLUs contained in the storage group 150 to be visible to the new backup SDNAS application 126, to enable that application to have access to the filesystems in case a subsequent local failover occurs within storage system 104.

A given storage system 104 may have many SDNAS processes 126 executing at any given time. By masking storage groups on the storage system 104 from the SDNAS processes 126, it is possible to reduce the number of TLUs presented to the emulation operating systems 124 to prevent the emulation operating systems 124 from being required to recognize an unreasonably large number of TLUs.

Figure 5:
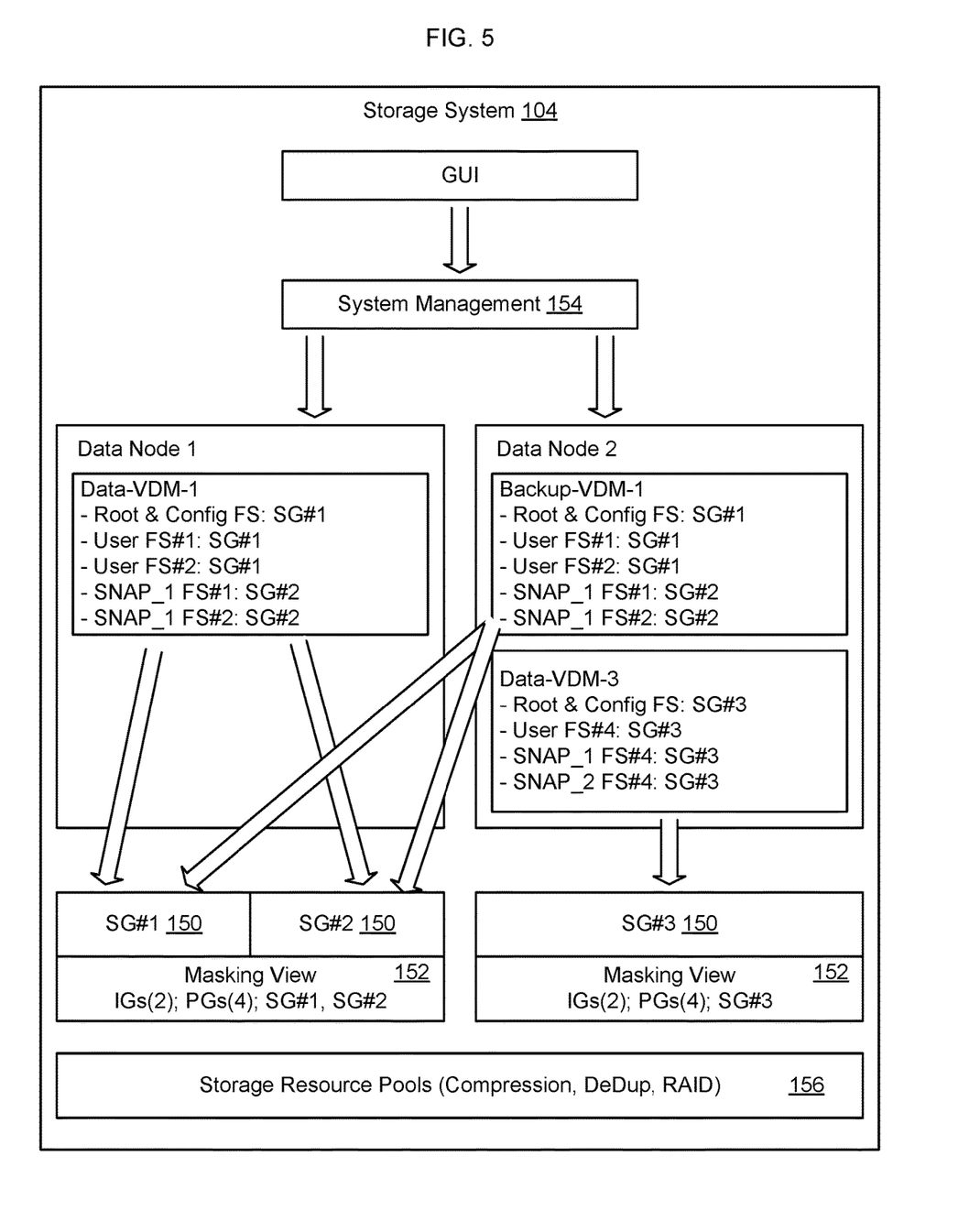

In some embodiments, a limited number of storage groups are used by each VDM to enable the load of the VNAS server 110 to be distributed within the storage system 104 but without requiring the emulation OS 124 to be exposed to an excessive number of TLUs. As shown in FIG. 5, in some embodiments, a masking view 152 is formed which restricts visibility of storage groups 150 and the TLUs contained in the storage group 150 to only two data nodes on the storage system 104—a primary data node and its backup data node. By restricting visibility of the TLUs 142, by the storage system 104, the emulation operating systems 124 of the emulations 122 in storage system 104 are presented with limited numbers of TLUs, thus accelerating boot operations of the emulation operating systems 124.

In some embodiments, a given data node may have VDMs with file systems stored in user filesystem TLUs 142 located in multiple storage groups 150, however storage groups 150 are not shared between data nodes, except between nodes in a primary/backup relationship for a given filesystem. All user filesystems 132 in the storage group 150 are therefore containerized in the storage group such that switching visibility of the storage group to a different set of data nodes enables containerized failover from a first set of data nodes to a second set of data nodes. Specifically, by changing the masking view 152 of the storage group 150 to make the storage group visible to another node or set of nodes in the storage system 104, the operating system 124 on the newly designated data node will have access to the TLUs contained in the storage group. The OS of the newly designated node will thus mount the TLUs and then will have access to the user filesystems 132 contained in the user filesystem TLUs 142. By including the root/configuration filesystem TLUs 140 in the same storage group 150 or set of storage groups 150 as the user filesystem TLUs 132, the newly designated data node has access to everything required to instantiate a VDM to handle the user filesystems. Thus, it is possible to containerize VDM filesystems in storage groups and achieve local failover within a storage system 104 simply by adjusting the masking view 152 applied to the storage groups used by the VDM.

FIG. 5 is a functional block diagram of an example storage system 104 according to some embodiments of the present disclosure. FIG. 5 contains logical object representations of TLUs and storage groups 150 within the storage system 104 on the primary side of a pair of storage systems 104 in a cluster. The secondary side is not shown, but has the same image as the storage groups 150 being replicated. In some embodiments, both primary and secondary side configuration are kept homogeneous to keep the architecture and implementation simple, to achieve high reliability and minimize failover times. As noted above, similar types of TLUs with similar SLO properties (e.g. compression/deduplication) are placed in a single storage group 150 for a given data node.

In some embodiments, a given VDM will use multiple storage groups. For example, the storage system 104 may create several storage groups 150 for the VDM that implement compression and de-duplication, and several storage groups 150 for the VDM that do not implement compression and/or de-duplication. Where a given VDM uses multiples storage groups, during local failover the masking view 152 of each storage group 150 used by the VDM is similarly adjusted to enable a newly designated node to assume responsibility (primary or backup) for the VDM and all the filesystems handled by the VDM. By including the root/configuration filesystem TLU in the set of storage groups, the new data node can instantiate a VDM using the same VDM root/configuration filesystem to enable the new VDM to have a synchronized view of the user filesystems and the location of the user filesystems within the storage array 108 of the storage system 104.

According to some embodiments, the masking view 152 of a storage group 150 enables only the primary data node and the backup data node to have access to the storage group 150 and, accordingly, to the TLUs contained within the storage group 150. An advantage of this is that the local failover is simple, because all storage groups 150 for this VDM that is to be failed over are already visible to the backup VDM on another data node, so there is no delay associated with configuring the backup VDM when failover is required. Further, by masking storage groups in this manner, only a limited number of TLUs are visible to the primary and backup VDM data nodes, so that the boot is not extremely slow nor does it hang the emulation operating system 124 on boot.

The cluster TLU, which is a shared TLU, needs to be visible to all the Nodes in the cluster, and hence needs a masking view that makes it available for access to all nodes. In some embodiments there is one cluster TLU created for the entire cluster and is shared with all the data nodes. The cluster TLU contains a filesystem describing the overall structure of the cluster. In some embodiments, the cluster TLU is also used for other shared filesystems, such as a management database (PostgreSQL), a log database, witness system, system management files, and other aspects that are required to be shared among all the Data Nodes.

In some embodiments, when a new data node is to be started, at the time of installation the storage system 104 will create one storage group 150 per data node. This storage group 150 is used to house the root/configuration TLU for the VDM root filesystem 134 and VDM configuration filesystem 136. The initial storage group 150 may also have other TLUs created, for example a TLU for the Linux Base OS.

As shown in FIG. 4, storage group 150 SG #1 contains root/configuration TLU 140, user filesystem #1 TLU 142, and user filesystem #2 142. Storage group 150 SG #2 contains snap filesystem TLUs 148 for snapshot filesystems (point in time copies) created by snapshot application 144 of user filesystem #1 (snap_1 FS #1 146) and user filesystem #2 (snap_1 FS #2 146). Although an example is shown in which the user filesystem TLUs 142 and snapshot TLUs 146 are contained in different storage groups 150, in some embodiments the TLUs 142, 146 may be contained in the same storage group 150.

FIG. 5 shows a storage system and, in particular, shows the masking view 152 of storage groups 150. As shown in FIG. 5, in some embodiments a system management process 154 creates masking views 152 for the storage groups 150 on storage system 104 to control which data nodes on the storage system 104 are able to see TLUs 142, 146, created within the storage groups 150 of the storage system 104. As shown in FIG. 5, the masking view for data node 1 identifies storage group 150 SG #1 and storage group 150 SG #2, which enables data node 1 to access TLUs stored in those storage groups 150.

In some embodiments, each masking view 152 also specifies additional information about the data node, such as an Initiator Group (IG) which corresponds to a list of data nodes that has access to the storage group. As shown in FIG. 5, in some embodiments where there is one primary data node and one backup data node, the initiator group will include two data node identifiers.

In some embodiments, the masking view 152 further specifies additional information about which constructs in the storage system 104 are able to access aspects of the storage group 150. For example, in the embodiment shown in FIG. 5, the masking view 152 specifies a Port Group (PG) which in this embodiment is a list a front-end adaptor (FA) ports on which the data clients 102 are connected to access the storage. The masking view may also include information about the Storage Group (SG) 150 itself, such as a list of which TLUs 142, 146 are contained in the storage group.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible computer readable medium such as randomaccess memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method for defining local failover within a storage system using storage group containers, comprising:
   creating a plurality set of storage groups from physical storage resources of a storage array of the storage system;
   creating a masking view identifying a first subset of the storage groups and specifying that Thin Logical Units (TLUs) in the first subset of storage groups are visible only to a primary Software Defined Network Attached Storage (SDNAS) process executing on the storage system and to a backup SDNAS process executing on the storage system;
   wherein the first set of storage groups includes a Virtual Data Mover (VDM) configuration/root TLU and all user data TLUs used by the primary SDNAS process.

2. The method of claim 1, wherein the primary SDNAS process is executing in a first emulation on the storage system, the first emulation having a first operating system, the method further comprising mounting, by the first operating system, each TLU in the first subset of storage groups; and
   wherein the backup SDNAS process is executing in a second emulation on the storage system, the second emulation having a second operating system, the method further comprising mounting, by the second operating system, each TLU in the first subset of storage groups.

3. The method of claim 2, wherein upon local failover, responsibility for filesystems having data stored in the TLUs of the first subset of storage groups is transferred from the primary SDNAS process to the backup SNDAS process.

4. The method of claim 3, wherein the masking view defines a storage group container for implementing local failover within the storage system from the primary SDNAS process to the backup SDNAS process.

5. The method of claim 3, wherein upon local failover, the method further comprising the step of changing the masking view to identify the backup SDNAS process and a third SDNAS process.

6. The method of claim 1, wherein the primary SDNAS process has a first user Virtual Data Mover (VDM) process executing in the context of the SDNAS process, the VDM process being configured to manage access to one or more user filesystems of the SDNAS process.

7. The method of claim 6, wherein the VDM configuration/root TLU contains a VDM root filesystem and a VDM configuration filesystem, the VDM configuration filesystem describing how data of the one or more user filesystems managed by the VDM is stored in the physical storage resources of the storage array.

8. The method of claim 6, wherein the SDNAS process has a plurality of user Virtual Data Mover (VDM) processes executing in the context of the SDNAS process, the plurality of VDM processes sharing the first subset of the storage groups to store data of the user filesystems managed by the VDM.

9. A storage system, comprising:
   a base operating system;
   a storage array containing physical storage resources, wherein storage groups are created from storage resource pools of the physical storage resources having particular storage characteristics;
   a hypervisor;
   a plurality of emulations, each emulation having a respective emulation operating system and one or more applications executing in the context of the emulation operating system; and
   a masking view restricting access by the emulations to storage groups of the storage array, the masking view specifying that a first subset of storage groups used by a primary Software Defined Network Attached Storage (SDNAS) process executing in a first of the plurality of emulations is only visible to the primary SDNAS process executing in the first of the plurality of emulations and to a secondary SDNAS process executing in a second of the plurality of emulations.

10. The storage system of claim 9, wherein the first subset of storage groups contains a first set of Thin Logical Units (TLU) mounted by the emulation operating system of the first of the plurality of emulations and mounted by the emulation operating system of the second of the plurality of emulations.

11. The storage system of claim 10, further comprising a first Virtual Data Mover (VDM) process executing in the context of the primary SDNAS process and responsible for a first user filesystem, the first user filesystem having data stored in one of the TLUs of the first set of TLUs, and a root/configuration filesystem of the VDM being stored in a second of the TLUs of the first set of TLUs.

12. The storage system of claim 11, wherein, upon failure of the first SDNAS process, responsibility for the first user filesystem is transferred to a second VDM process executing in the context of the backup SDNAS process, the second VDM having the same root/configuration filesystem as the first VDM process.

13. The storage system of claim 9, wherein the primary SDNAS process comprises a plurality of Virtual Data Mover (VDM) processes, each VDM process being responsible for at least one user file system, and wherein the masking view specifies a subset of the storage groups of the storage array containing a set of TLUs that contain data of all of the user filesystems and root/configuration file systems for each of the plurality of VDM processes.

14. The storage system of claim 13, wherein the subset of the storage groups provides a container for local failover of the plurality of VDM processes from the primary SDNAS process to the backup SDNAS process.

15. The storage system of claim 9, wherein the masking view is a set of data structures, each data structure being associated with one of the storage groups, each data structure containing information identifying a set of SDNAS processes with access to TLUs contained in the respective storage group.

16. The storage system of claim 15, wherein the data structure further contains information identifying an initiator group corresponding to a list of data nodes that has access to the storage group.

17. The storage system of claim 15, wherein the data structure further contains information identifying a port group corresponding to a list of front end ports on which data clients are connected to access data stored in the TLUs contained in the respective storage group.

\* \* \* \* \*